March 5, 1968  E. WILDHABER  3,371,395
GEAR-SHAPED CUTTER

Filed Feb. 18, 1966  2 Sheets-Sheet 1 known art

INVENTOR:
Ernest Wildhaber

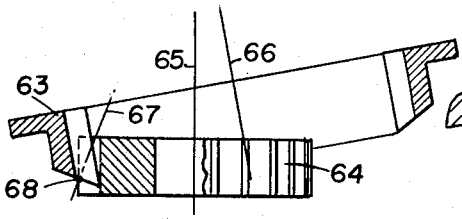
FIG. 10
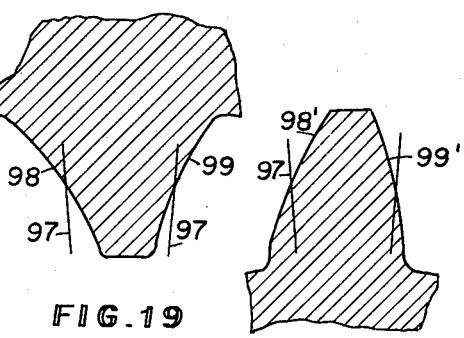
FIG. 19
FIG. 20
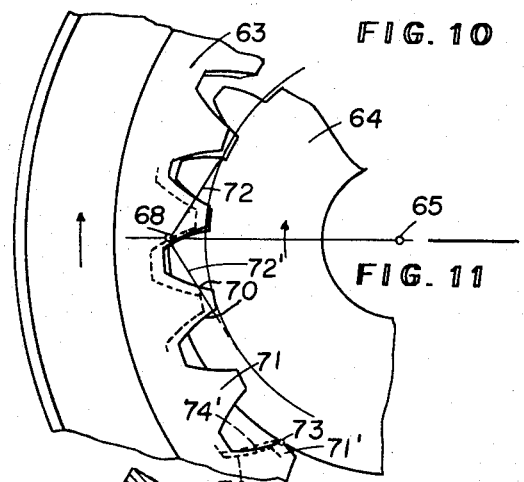
FIG. 11
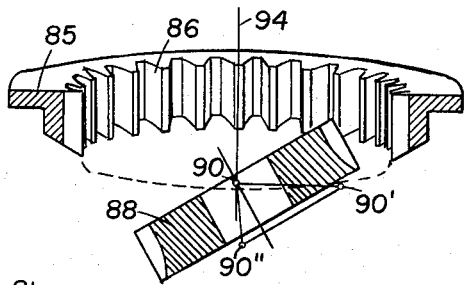
FIG. 16
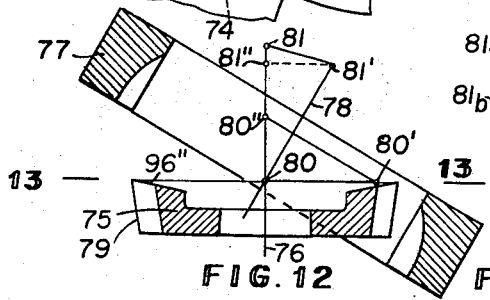
FIG. 12
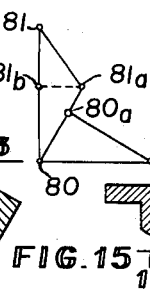
FIG. 15
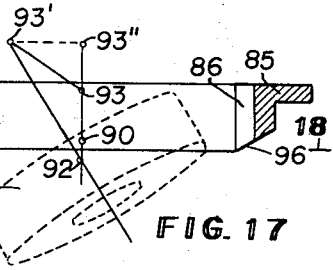
FIG. 17
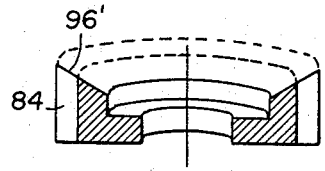
FIG. 14
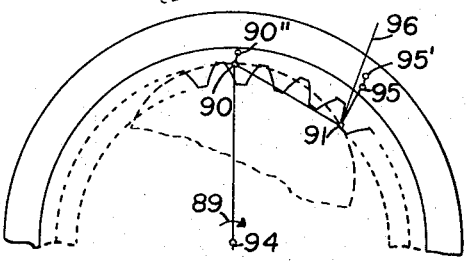
FIG. 18
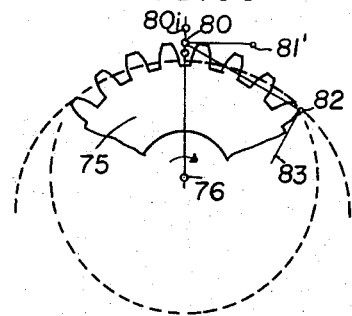
FIG. 13
INVENTOR:
Ernest Wildhaber United States Patent Office 3,371,395
Patented Mar. 5, 1968

3,371,395
GEAR-SHAPED CUTTER
Ernest Wildhaber, Brighton, N.Y.
(124 Summit Drive, Rochester, N.Y. 14620)
Filed Feb. 18, 1966, Ser. No. 528,544
16 Claims. (Cl. 29—103)

The present invention relates to gear-like cutters that have cutting teeth arranged in a circle about an axis, and particularly to cutters adapted to engage a gear cut therewith in internal mesh, that is to cutters with externally arranged teeth for cutting internal gears and to cutters with internally arranged teeth for cutting external gears. They may be embodied either as reciprocatory tools, where the cutting motion is achieved by straight or helical reciprocation, or they may be embodied as rotary tools whose axis is set at an angle to the axis of a gear to be cut and is offset therefrom. On these the relative motion effected by rotation of tool and gear provides the cutting motion.

Cutters of both types generally produce a fillet on the teeth cut, which connects the tooth side proper with the tooth bottom. On involute teeth for instance the involute does not reach all the way to the tooth bottom, but is connected with the tooth bottom through a concave fillet. This fillet stands out from the involute and is produced by a corner of a cutting tooth. It has a finish much inferior to the finish produced on the side surfaces of the teeth. In some applications the fillet itself is bothersome and may give tooth interference. This occurs for instance on gear couplings comprising a sleeve with teeth internally provided thereon and a hub with crowned external teeth in engagement therewith, where the spherical outside surface of the hub teeth engages the bottom of the sleeve teeth for centering.

One object of the invention is to do away with the interfering portions of the fillet ordinarily produced and to provide a cutter capable of cutting a tooth profile on an internal gear joining the tooth bottom with a sharp corner, if so desired. A further object is to provide a cutter with external teeth that has a rounded protuberance at the outer ends of its cutting teeth and that is capable of transmitting the shape of the protuberance without distortion to the teeth cut.

A still other object is to provide a cutter with external teeth where the ordinarily sharp corners at the outside end of the cutting teeth are rounded off, and that nevertheless cuts the tooth profile proper as close to the root as conventional cutters with sharp corners and that gives a smooth connection with good finish between said profile and the tooth bottom. Such cutters also have increased life, as the sharp corners of conventional cutters are their principal weakness.

The invention applies to cutters whose tooth ends follow a tapered and approximately conical surface, and to cutters whose tooth ends follow a cylindrical surface coaxial with the cutter, and whose diameter does not change through sharpening. However these latter cutters have further limitations of cutting clearance when cutting into solid material, without prior roughing.

Another object is to remove or reduce said further limitations and to remove or reduce the limitations of all rotary cutters cutting into solid material.

Other objects will appear in the course of the specification and in the recital of the appended claims.

In the drawings:

FIG. 10 is an axial section of an internal reciprocatory cutter constructed according to the invention. It is shown in engagement with a gear being cut.

FIG. 11 is an enlarged fragmentary view taken along the axis of the gear shown in FIG. 10.

FIG. 12 is an axial section of a rotary cutter and an axial section at a different level of an internal gear cut therewith, containing also a diagram explanatory of the relative motion when the gear teeth are helical.

FIG. 13 is a fragmentary view taken along the axis of the cutter shown in FIG. 12, and a section 13—13 of the gear body.

FIG. 14 shows a modified form of cutter in place of the cutter shown in FIG. 12.

FIG. 15 is a diagram similar to the diagram shown in FIG. 12 but relating to a gear with straight teeth.

FIG. 16 is an axial section of a helical gear and a corresponding view and section of an internal cutter having cutting teeth that extend lengthwise at a constant distance from the cutter axis. The cutter is tilted for cutting clearance.

FIG. 17 is an axial section of this cutter, with its axis lying in the drawing plane, and a corresponding view of the contour of the gear.

FIG. 18 is an axial view of the internal cutter shown in FIGS. 16 and 17 and a fragmentary section along plane 18—18 of FIG. 17 of the outside surface of the gear. FIGS. 16 to 18 also contain diagrams of relative motion.

FIG. 19 is a cross-section of cutting tooth taken at right angles to the axis of an internal cutter.

FIG. 20 is a similar cross-section of a cutting tooth of an external cutter.

Figure 1:
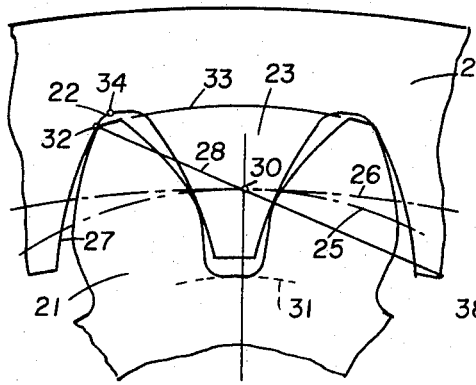
FIG. 1 is a fragmentary axial view of an internal gear in engagement with a reciprocatory cutter, taken along the gear axis and showing known art.

The conventional reciprocating cutter 21 forms a fillet 22 at the base of the teeth 23 of internal gear 24. As it cuts it also turns slowly on its axis in engagement with the turning gear 24, so that a pitch circle 25 fixed to the cutter rolls without sliding on a pitch circle 26 fixed to the gear. It thereby generates the side tooth-profiles 27 along a path of contact 28 that passes through the pitch point 30, the contact point of said pitch circles. Pitch point 30 is about half the tooth height away from the inmost boundary or root circle 31 of the cutting teeth on standard gears having equal dedendum proportions, less when the internal gear has a long dedendum. The path of contact 28 comes to an end at point 32, at its intersection with the outside circle 33 of the cutter. From point 32 to point 34 of the gear-tooth bottom the fillet 22 is formed by the corner of the cutting tooth. The finish so obtained is much inferior to the finish obtained along path 28. Also the said corners constitute the weak part of the cutter which gets dull there first.

Besides the fillet stands out from the tooth profile proper and in some applications produces an interference.

Figure 2:
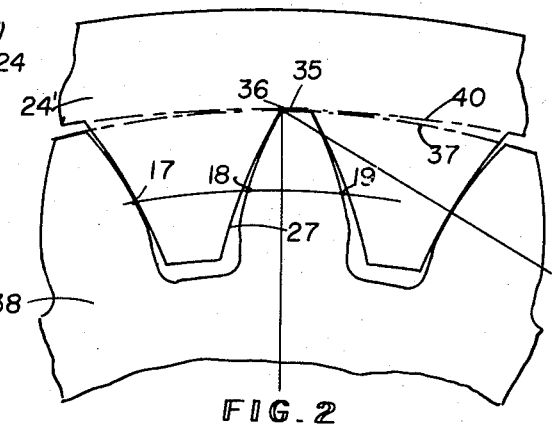
FIG. 2 is a similar view showing however one form of cutter constructed according to the present invention.

FIG. 2 shows a cutter that gets rid of the fillet, in accordance with the invention. It generates a tooth profile 27 clear to the bottom. Its generating feed is a rolling motion with pitch point 36, so that circle 37 of cutter 38 rolls without sliding on circle 40 of the internal gear 24'. Circle 40 coincides with the root circle of the internal gear. Here there is no side-swiping action when the tooth bottom is being generated. For an instant the relative motion between cutter and gear is as if one would turn with respect to the other about point 36. Here the cutter shape at and directly adjacent circle 40 is reproduced without distortion on the workpiece. And it is possible to generate a sharp corner if desired.

Figure 3:
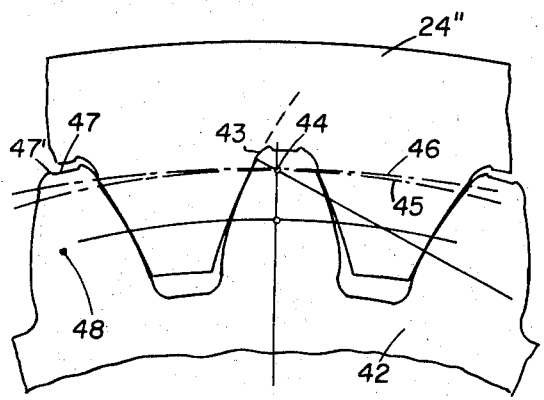
FIG. 3 is a similar view showing a modified form of cutter.

FIG. 3 shows a cutter 42 with protuberance 43 that is for the most part a circular arc with center 44. Point 44 is here the pitch point during generation, the contact point of the rolling circles 45, 46 of cutter 42 and gear 24″. In this way the cutter protuberance is reproduced on the workpiece practically without distortion and without extension. The protuberance is such as to do away with all interference. The end profile 47 of the cutting teeth 48 comprises a main portion and smaller side portions 47′. The side portions 47′ are parts of the protuberance, which extends beyond the extended main portion of end profile 47.

Figure 4:
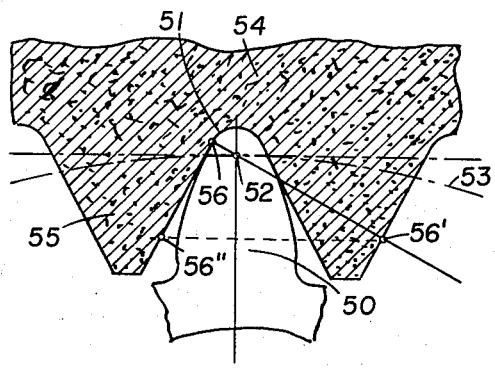
FIG. 4 shows a further form of cutter constructed according to the invention in engagement with a threaded member for grinding it.

FIG. 4 shows a cutting tooth 50 of a cutter with rounded end profile 51, that is a circular arc centered at 52. This point 52 is made the pitch point during generation. It is the contact point between the pitch circle 53 of the cutter and a circle of the internal gear that rolls on circle 53 without sliding. Circular arc 51 is then reproduced exactly on the internal gear. Rather than a single circular arc 51 I may also use two arcs of smaller radius at the opposite sides of the cutting tooth. Such a cutter can generate the working profile of an internal gear close enough to the root to avoid interference, where ordinarily sharp corners are required on the cutter teeth.

The convex rounded portion 51 (FIG. 4) and 43 (FIG. 3) occupy more than five percent of the cutter-tooth height.

At mid-height of the cutter teeth the tooth thickness 18–19 (FIG. 2) of the cutters shown in FIGS. 2 to 4 is generally smaller than their space width 17–18.

FIG. 4 also illustrates a preferred way of grinding such cutters. Grinding member 54 has a helical thread 55 of such a lead that the pitch point of its mesh coincides with point 52. The thread sides have a normal distance 56–56′ from each other that is approximately the same as the normal pitch of conventional cutters. But the axial pitch 56′–56″ is larger and the profile inclination is larger. The axial pitch is approximately equal to the cutter pitch at circle 53. The thread 55 has a root profile that matches end profile 51.

Figure 5:
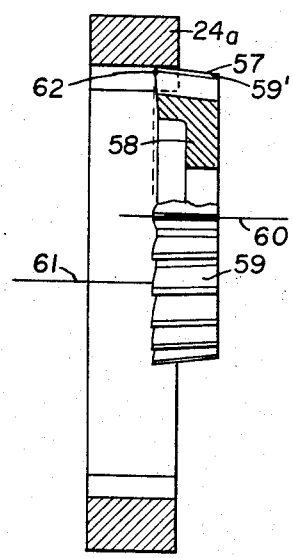
FIGS. 5 and 6 are side views of reciprocatory cutters in engagement with internal gears they cut.
Figure 6:
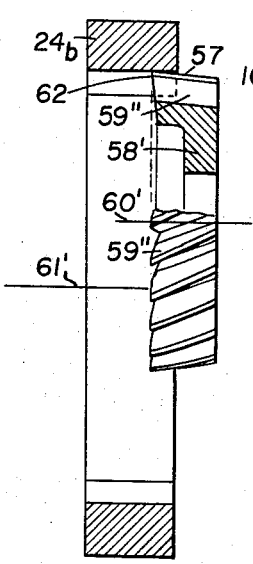

As the cutter and grinding member rotate on their axes in engagement with each other, feed motion is effected between them in an axial plane of the cutter in a direction inclined to the cutter axis if the cutter has a tapered outside surface 57 (FIGS. 5 and 6).

FIG. 5 shows a reciprocatory cutter 58 with straight teeth 59 in engagement with an internal gear 24$_a$. The cutter teeth have rounded end portion 59′. Cutter 58 is reciprocated along its axis 60 that is parallel to axis 61 of gear 24$_a$, while simultaneously cutter and gear turn slowly on their axes so that two circles passing through point 62 and fixed to the cutter and to the gear respectively roll on each other without sliding.

The cutter 58′ shown in FIG. 6 has inclined cutting teeth 59″ for cutting helical teeth on internal gear 24$_b$. It is helically reciprocated along its axis 60′ while the rotational feed motions are the same as with cutter 58.

Cutters that have tapered outside surfaces 57 decrease in diameter as they are resharpened. This requires a radial displacement of the cutter axis after sharpening to cut the same tooth height, and it changes the position of the pitch point at which the two rolling circles contact. However the change produced by a small change $\Delta r$ in cutter radius can be shown to be proportional to the square of $\Delta r$ ($\Delta r^2$), and thus stays small, as the square of a small quantity $\Delta r$ is very small. The described position of the pitch point during generation applies exactly to a mean stage of the cutter life.

FIGS. 2 to 4 also apply to cutters with cylindrical outside surfaces. Here the cutter axis is inclined to the axis of the internal gear, to produce cutting clearance. Reciprocation is in the direction of the gear axis, or along and helically about the gear axis when helical teeth are to be produced.

FIGS. 10 and 11 illustrate an application of my invention to internal reciprocatory cutters. Cutter 63 engages the gear 64 it generates in internal mesh. To produce straight gear teeth reciprocation is in the direction of the gear axis 65. It may be performed either by the gear or the cutter. Generation is effected by a slow timed turning motion about the gear axis 65 and the cutter axis 66, whereby the gear described by the cutter and the gear being cut roll on each other. As known, such rolling motion has an instant axis of relative motion 67, which in accordance with the invention passes through a pitch point 68. Pitch point 68 has a distance from the cutter axis 66 exceeding that of the inmost boundary of the cutting edges 70 by at least two thirds of the height of the cutting teeth 71. It is shown immediately adjacent the root surface of the cutting teeth.

FIG. 11 illustrates the effect of the displacement of pitch point 68 away from the cutter axis, as compared with its conventional position. It also shows up a limitation of this otherwise very practical cutter whose cutting teeth 71 extends lengthwise at a constant distance from the cutter axis, a limitation overcome by the invention.

The paths of contacts 72, 72′ of opposite tooth sides, or their extensions, pass through pitch point 68. Cutter teeth 71, if straight and parallel to the cutter axis 66 have ample cutting clearance in this region. They may lack however cutting clearance near point 73 when they cut into solid material without prior roughing. A side surface of cutting tooth 71′ is bounded by dotted lines 74′ when the cutting teeth are straight. As the side surface is visible in the direction of reciprocation axially of the gear, no cutting clearance exists in this position.

According to my invention I use slightly helical cutter teeth to cut a spur gear with straight teeth. Dotted lines 74 then define the tooth boundary at the rear, indicating cutting clearance. Lines 74 are also shown on the more central teeth. It is seen that with slightly helical cutter teeth the cutting clearance along the paths of contact 72, 72′ is still sufficient although unequal. The cutting teeth more on the leaving side are out of contact with the workpiece and thus do not require cutting clearance.

The position of the pitch point 68 is also important in obtaining cutting clearance. Displacement away from the cutter axis to the position shown and beyond increases the inclination of the paths of contact. It thereby increases the cutting clearance obtained along said paths at a given inclination of the cutter axis, and it increases the profile inclination of the cutting teeth, further improving the clearance at tooth 71′.

Rotary cutters

FIGS. 12 and 13 show a rotary cutter 75 with axis 76 in cutting engagement with an internal gear 77 whose axis 78 is set at an angle to axis 76 and is offset therefrom. For simplicity FIG. 13 shows only the cutting edges of cutter 75, although it is a rear view thereof. Cutter 75 has the conventional general appearance. The ends of its cutting teeth extend along a tapered and approximately conical outside surface 79. The pitch point 80 of its mesh lies here at the outside end of the cutter teeth. At the pitch point the cutter path matches the direction of the gear teeth and their profile inclination.

It will now be shown how the displacement of the pitch point away from the cutter axis improves the cutting clearance, in addition to giving a direct reproduction of the cutter path there without distortion, as described for reciprocatory cutters.

The relative velocity between cutter and gear is known to be obtainable from two components. One is the relative velocity at the pitch point, its speed and direction. The other is the turning velocity about an instant axis passing through the pitch point. It is obtained as the product of the angular velocity about this instantaneous axis and the normal distance of the considered point from said axis. The direction of the instantaneous or instant axis and the angular velocity about it is known to be obtainable by geometric addition of the angular velocities about axes 76, 78 treated as vectors.

In FIG. 12 distance 80—80′ is a measure of the peripheral velocity of the cutter at the pitch point, while 80′–80″ measures the peripheral velocity of the gear at the pitch point. 80–80″ measures the relative velocity at the pitch point. In the instance illustrated it is in the direction of the cutter axis, and does not show up in FIG. 13.

The angular velocities are inversely proportional to the tooth numbers. 80–81 measures the angular velocity about the cutter axis 76 while 80–81′ measures the angular velocity about the gear axis. 80–81′ defines the direction and amount of the relative angular velocity.

The outside circle of the cutter intersects the inside ellipse of the gear body at 82. This is the critical point where the relative velocity should be determined. The projection of the relative angular velocity 81–81′ to the drawing plane of FIG. 13 coincides with the projected direction 80–81′ and only affects the relative velocity axially of the cutter. This has no bearing on the cutting clearance when the cutter teeth are straight. The only component that matters then is the turning velocity about pitch point 80. It is perpendicular to line 80–82. To clear, the straight cutter tooth should withdraw from the workpiece in a direction not more inclined to the radial direction than the tangent 83 to the projected cutter profile. In the illustrated case the direction of the relative velocity coincides with said tangent. Cutter 75 has cutting clearance because its tooth sides are relieved. An increase of distance 80–82 would however reduce the clearance and soon turn it into interference. A pitch point such as 80₁ still further away from the cutter axis increases the cutting clearance, as it decreases the inclination of the relative velocity at 82 to the radial direction.

When the cutter teeth are helical the relative velocity at the considered point 82 should be in a direction that intersects the cutter tooth.

A cutter 84, FIG. 14, may be used in place of cutter 75. Cutter 84 has cutting teeth that extend lengthwise at a constant distance from the cutter axis. It does not change in diameter through sharpening and cuts an absolutely identical shape and fillet during its whole life. Also it has simple straight or helical tooth sides correct also for non-involute shapes. However it presents some further clearance problems. These will be discussed in detail in connection with FIGURES 16 to 18 which refer to an internal cutter. In this respect the present application can be considered an improvement on the disclosure presented in my allowed application Ser. No. 372,852.

FIG. 15 is a diagram similar to the diagram shown in FIG. 12 but referring to straight teeth on the internal gear and helically arranged teeth on a cutter having the same body dimensions as cutter 75, 80′–80ₐ represents the peripheral velocity of the gear at pitch point 80. 80–81ₐ is the angular velocity of the gear. 81–81ᵦ is the component in the direction of the cutter axis of the relative angular velocity.

FIGS. 16 to 18 show an internal cutter 85 whose cutting teeth 86 extend lengthwise at a constant distance from the cutter axis 94. It engages a gear 88 being cut. Cutting clearance is obtained by the tilted position of the cutter 85. The cutter rotates in the direction of arrow 89.

The mesh during generation corresponds to a pitch point 90 that lies approximately on the root surface of the internal cutter. The worst position for cutting clearance is at point 91, where the cutting tooth leaves the outside surface of the gear 88. It will now be shown how to determine the direction and speed of the relative velocity particularly at this point, to check whether or not it has enough cutting clearance. For clearance its direction should remain inside of the cutter tooth. This means also inside of its tooth profile on the straight cutter teeth 86 shown. 90–90′ (FIG. 16) is a measure of the peripheral velocity of the cutter at pitch point 90. 90′–90″ measures the gear velocity at 90. 90–90″ is the relative velocity or cutting velocity at pitch point 90. It should be noted that it is inclined to the direction of the cutting teeth 86, as they appear in FIG. 16, for improved cutting clearance.

92–93 (FIG. 17) is a measure of the angular velocity of the cutter about its axis 94, while 92–93′ measures the angular velocity about the gear axis, in projection. 93–93′ measures the relative angular velocity, in projection, being inclined to the drawing plane of FIG. 17.

The relative velocity at point 91, in the axial view FIG. 18, is composed of a turning velocity 91–95 about pitch point 90, and of the relative velocity 95–95′ at the pitch point, which is identical with 90–90″. Turning velocity 91–95 corresponds to a relative angular velocity component measured by distance 93–93″ in FIG. 17. The said relative velocity should stay inside of the tangent 96 to the cutter-tooth profile at point 91.

With helical teeth on gear 88 the component 91–95 is larger than component 95–95′. Even so it is seen that the inclined direction of component 95–95′ is helpful. Displacement of the pitch point 90 further away from axis 94 also would increase the cutting clearance. In such ways sufficient cutting clearance can be obtained in a wide field of application.

The provision of unequal cutting clearance on opposite sides, at full-depth engagement, is reflected in the tooth design of the cutter. This is particularly evident when the cutter has straight teeth, or teeth which are only slightly helical, so that the cutting teeth may have cutting faces that lie in a common surface of revolution, as shown at 96, 96′ and 96″ in FIGS. 17, 14 and 12 respectively. Although the profile inclinations are equal on both sides of the gear teeth, the cutter teeth have unequal profile inclinations on opposite sides, in planes perpendicular to the cutter axis. This is shown in FIGS. 19 and 20. The profile inclination to the radial direction 97 is larger on side 98 than on side 99 on the internal cutter illustrated in FIG. 19. It is larger on side 98′ than on side 99′ on the external cutter shown in FIG. 20. The difference is shown exaggerated, but is more than three times the combined tolerances for profile inclination of the two sides.

Figure 7:
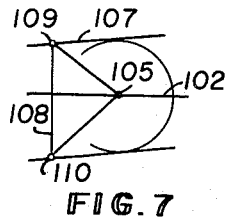
FIGS. 7, 8 and 9 are diagrams explanatory of a principle underlying some embodiments of the present invention.
Figure 8:
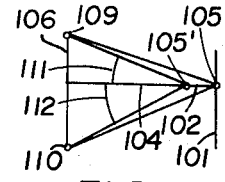
Figure 9:
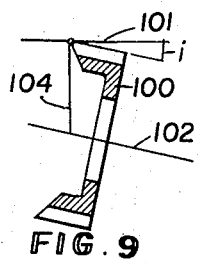

Diagrams FIGS. 7 to 9 illustrate a way of determining the inclinations of the cutter profiles at the pitch point or a mean point.

The diagrams are for a straight-tooth cutter 100 (FIG. 9) that cuts in a slightly inclined path for improved cutting clearance in the roughing region. Similar determinations can be made for other cutters with the knowledge of the art.

101, FIG. 9, is a plane containing the cutting direction. FIG. 7 is a diagrammatic view perpendicular to plane 101, showing cutter axis 102 in projection. FIG. 8 is a side view corresponding to FIG. 7.

The tangent planes of opposite gear-tooth sides extend in the cutting direction and are equally inclined to the depthwise direction 104. They pass through the considered point 105 and intersect a plane 106 parallel to plane 101 in a pair of straight lines 107 (FIG. 7). Because of the equal inclination of the gear profiles lines 107 have equal distances from projected point 105 and are tangent to a circle drawn about it. They are inclined to the projected cutter axis 102 to add more clearance to one side.

The plane or tangent plane of the cutting face intersects plane 106 at trace 108 that contains the points 109, 110 of lines 107. 105–109 and 105–110 are the tangents to the opposite cutting edges. The profile inclinations in any plane perpendicular to cutter axis 102 appear when looking at these tangents in the direction of the cutter axis, which is inclined to plane 101 at an angle $i$ (FIG. 9). Point 105 then appears in a position 105' (FIG. 8). The profile inclinations 111, 112 are clearly seen to be unequal.

Unequal profile inclinations also occur when the cutting faces do not lie in a common surface. In general the profile inclination of the cutter teeth in planes normal to the tooth direction is smaller than the specified normal pressure angle of the gears cut therewith. Also the tooth thickness of the cutter at mid-height of the teeth is smaller than the space width (FIG. 2). The difference amounts to at least five times the tolerance for tooth thickness.

I claim:

1. A generating cutter adapted to engage a gear cut therewith in internal mesh, having a plurality of identical cutting teeth spaced in a circle about its axis, cutting edges being formed thereon by cutting faces, said cutter being designed so that the pitch point of said mesh has a distance from the cutter axis exceeding that of the inmost boundary of the cutting edges by at least two thirds of their radial height at the mean stage of the cutter life, whereby at said distance the profile inclination of the cutter path matches the profile inclination of said gear.

2. A reciprocatory gear-shaped generating cutter adapted to engage a gear cut therewith in internal mesh with its axis parallel to the axis of said gear, having a plurality of identical cutting teeth spaced in a circle about its axis, cutting edges being formed thereon by cutting faces, the ends of said cutting teeth extending along a tapered and approximately conical surface coaxial with the cutter, said cutter being designed so that the pitch point of said mesh has a distance from the cutter axis exceeding that of the inmost boundary of the cutting edges by at least two thirds of their height at the mean stage of the cutter life, whereby at said distance the profile inclination of the cutter path matches the profile inclination of said gear.

3. A gear-shaped cutter according to claim 2 for cutting internal gears, having cutting teeth projecting outwardly from a body portion, wherein a rounded cutting portion is provided at the outside ends of the cutting teeth, said rounded portion occupying more than five percent of their tooth height.

4. A gear-shaped cutter according to claim 1 for cutting internal gears, having cutting teeth projecting outwardly from a body portion, wherein the side profiles of each cutting tooth contain a protuberance adjacent their outer end, said protuberance containing a rounded-off portion occupying more than five percent of the tooth height.

5. A gear-shaped cutter according to claim 4, wherein the end profile of the cutting teeth comprises a main portion and smaller side portions, and wherein a portion of said protuberances extends beyond the continuation of the main portion and forms said side portions.

6. A cutter according to claim 1 for cutting external gears, having cutting teeth projecting inwardly from a ring-shaped body portion.

7. A cutter according to claim 6, whereon its cutting teeth extend lengthwise at a constant distance from the cutter axis.

8. A cutter according to claim 1 adapted to cut into solid material, whereby its cutting clearance changes with the engagement depth of the cutting teeth and decreases on one side from the clearance at full-depth position while increasing on the opposite side, the direction of the cutting teeth and their profile shape being such as to give more clearance at full-depth position to said one side than to the opposite side, so that the cutter is usable only when turning in one direction, said cutter being sold with instructions specifying said one direction.

9. A cutter according to claim 1, whose cutting teeth extend lengthwise at a constant distance from the cutter axis and that is positioned to effect cutting clearance, said clearance changing with the engagement depth of the cutting teeth when cutting into solid material, and decreasing on one side from the clearance at full-depth position while increasing on the opposite side, the direction of the cutting teeth and their profile shape being such as to give more clearance at full-depth position to said one side than to the opposite side, so that the cutter is usable only when turning in one direction, said direction being marked on the cutter.

10. A cutter according to claim 9, wherein all the cutting teeth have cutting faces lying in a common surface of revolution whose profile is inclined to planes perpendicular to the cutter axis, and where in said planes the profile inclinations of opposite sides of the cutting teeth to the radial direction differ by more than three times their combined tolerances for profile inclination.

11. A rotary cutter according to claim 1, adapted to cut into solid material, whereby cutting clearance changes with the engagement depth of its cutting teeth and decreases on one side of the cutting teeth from the clearance at full-depth position while increasing on the opposite side, said cutter having more cutting clearance at said full-depth position on said one side than on the opposite side, so that the cutter should be used only when turning in one direction, said one direction being marked on the cutter.

12. A cutter according to claim 1 for cutting teeth whose profile inclination to the radial direction is equal on opposite tooth sides wherein the cutting faces of all the cutting teeth lie in a common surface of revolution whose profile is inclined to planes perpendicular to the cutter axis, and wherein the profile inclination in said planes to the radial direction differs on opposite sides of said cutting teeth by more than three times their combined tolerances for profile inclination.

13. A cutter according to claim 1 for cutting teeth whose profile inclination to the radial direction is equal on opposite tooth sides, wherein the cutting teeth extend lengthwise at a constant distance from the cutter axis, and where the opposite profiles of said cutting teeth in planes perpendicular to the cutter axis have unequal inclinations to the radial direction, both of said inclinations being smaller than the profile inclinations of the gears cut therewith.

14. A rotary cutter according to claim 1 for cutting a limited range of tooth numbers at best efficiency, having teeth differently directed to axial planes than the gear teeth it cuts, said range being marked on said cutter.

15. A rotary cutter according to claim 14, that has cutting teeth extending lengthwise at a constant distance from its axis.

16. A cutter according to claim 1, wherein at mid-height of the cutter teeth the tooth-profile inclination in planes normal to the tooth direction there is smaller than the specified normal pressure angle of the gears it cuts, and wherein the cutter tooth thickness at said mid-height is smaller than the space width by at least five times the tolerance for thickness, at mid-life of the cutter.

No references cited.

HARRISON L. HINSON, *Primary Examiner.*